Patented Mar. 9, 1926.

1,576,436

UNITED STATES PATENT OFFICE.

DANIEL SNYDER GUSTIN, OF EAST ORANGE, NEW JERSEY, ASSIGNOR TO WESTINGHOUSE LAMP COMPANY, A CORPORATION OF PENNSYLVANIA.

SEAL AND METHOD FOR MAKING THE SAME.

No Drawing. Application filed March 30, 1921. Serial No. 457,101.

*To all whom it may concern:*

Be it known that I, DANIEL SNYDER GUSTIN, a citizen of the United States, and a resident of East Orange, in the county of Essex and State of New Jersey, have invented a new and useful Improvement in Seals and Methods for Making the Same, of which the following is a specification.

My invention relates to the construction of joints or unions between a silicious material and metals, and more particularly it relates to leading-in conductors which are to be sealed in a container of glass or other vitreous material through which the conductor extends and with which said conductor must form a gas-tight seal.

An object of my invention is to provide a method of uniting a metal or alloy to a silicious material.

Another object of my invention is to provide a novel metallic lead-in wire which will make a satisfactory gas-tight seal with glasses having different coefficients of expansion.

Other objects of the invention will be apparent from the following description.

I have discovered that chromium readily wets with glass, and, for that reason, it may be employed as a leading-in conductor or as a medium for joining or welding to glass a conductor which does not have the property of wetting with glass. In utilizing this property of chromium, many applications of it may be made in joining or sealing-in leading-in conductors to vessels or containers in which gas-tight joints are required for the efficient operation thereof.

In practice, a gas-tight seal may be obtained by coating with chromium a metallic core which, in itself, may be composite in structure and have a predetermined coefficient of expansion approximating that of the glass into which the conductor is to be sealed. By having a relatively thin deposit of the chromium upon the metallic core, the coefficient of expansion of the core material is substantially unaffected. It is, therefore, apparent, that, to produce a satisfactory seal between a metal and a silicious material, it is only necessary to employ a metal having a coefficient of expansion substantially equal to that of the silicious material, and to join this metal, through the agency of chromium, to the wall of the silicious object which may be glass.

Heretofore, leading-in conductors have been made of metals which have the characteristic of wetting with glass and have a coefficient of expansion substantially equal to that of the glass into which they are sealed. The number of metals heretofore known as having these two characteristics is small, and, for this reason, efforts have been made to develop leading-in conductors of other metals or of metals alloyed together in various proportions.

While platinum, tungsten, and molybdenum have been successfully used for leading-in conductors, the expensiveness of platinum is obviously an objection to its commercial use, and the use of tungsten and molybdenum is confined to hard glasses, inasmuch as they cannot be successfully used with soft glasses.

Among the newly developed conductors, is a composite wire consisting of a metallic core having a coefficient of expansion less than that of the glass into which it is to be sealed and a layer of metal on said core having a coefficient of expansion greater than said glass.

My invention, as relating to a leading-in conductor, particularly useful for incandescent electric lamps, is distinguished from the above described composite wire type of leading-in conductor by employing a metal which satisfactorily wets with glass to perform the function of a sealing medium or agent, and applying this metal to a core which has a coefficient of expansion substantially equal to the glass into which it is to be sealed. The wetting metal, in this instance, is preferably of small volume, and, therefore, its association with the core does not materially change the coefficient of expansion of the core. When desirable, the metal employed as the medium or agent may be of sufficient volume to act alone as the electrical leading-in conductor.

Leading-in conductors of the type set forth in this application eliminate certain undesirable features of the so called graded seals; one of these features being excessive assembly of glass necessarily required in that type of seal. My type of leading-in conductor also provides a quick, satisfactory method of attaching various types of electrical conducting metals or alloys to glass or other materials of like composition, and eliminates objectionable features inherent in other types of seals.

In the present mode of manufacturing certain types of incandescent lamps, such, for example, as those of the miniature type, a copper-coated conductor has the disadvantage that the copper is oxidized by the flame employed in fusing the glass to the conductor, so that trouble is experienced in making a satisfactory gas-tight joint between the conductor and the glass.

My invention, for purposes of description, will be set forth as directed to a composite metal leading-in conductor for use in incandescent electric lamps and further, it will refer to a conductor comprising a metallic core having a coefficient of expansion approximating that of the glass into which it is to be sealed. The core is preferably provided with a thin layer of chromium. One of the purposes of covering the metallic core with chromium is to provide a material which will make a satisfactory joint or union with the glass, and it is to be noted that a coating of chromium is not specifically applied to alter the coefficient of expansion of the metal core, as has previously been proposed for other combinations of metals, as there is no requirement to produce a composite leading-in wire of metals which have coefficients of expansion different from that of the core. Moreover, the thickness of the coating of chromium is not sufficient to materially change the coefficient of expansion of the core. Any desired core may be employed upon which to apply the layer of chromium, and, if desired, a metal or alloy having the proper coefficient of expansion, or a composite metal core with a predetermined coefficient, may be employed.

In practicing my invention any material may serve as the core, its selection being directed by the character of seal desired to be made. However, for the purpose of illustration, I will set forth a process for making a satisfactory leading-in conductor or wire which may be used in the manufacture of incandescent lamps. In this instance, the core material is preferably nickel-iron alloy having a suitable coefficient of expansion, and chromium may be deposited thereon by electrolysis. The electrolytic method for the deposition of the chromium is preferred as it provides means for more accurately controlling the thickness and uniformity of the deposit. In using this method the variable factors, such as the composition and temperature of the electrolyte and the current density may be adjusted, by anyone skilled in the art, to secure a satisfactory deposit of the chromium on the nickel-iron core. When the desired thickness of chromium has been deposited on the core the resultant leading-in conductor is suitable for making an air tight seal with the press of an incandescent lamp bulb.

It is understood that other methods of depositing the chromium upon the core material may be used as, for example, such well known processes as sherardizing or calorizing metals.

This invention is capable of being employed for a variety of purposes and under various circumstances and it is considered that such modifications come within the scope of this invention.

What is claimed is:—

1. As a leading-in conductor, a wire having a chromium surface.

2. As a leading-in conductor a chromium coated wire.

3. As a leading-in conductor, a metallic core having a sheath of chromium.

4. As a leading-in conductor, a composite wire comprising a chromium-coated alloy.

5. As a leading-in conductor a composite wire comprising a chromium-coated nickel-iron alloy.

6. A leading-in conductor comprising a wire composed of a metallic core having an electrolytic deposit of chromium thereon.

7. As a leading-in conductor, a wire having a layer thereon presenting a surface entirely of chromium.

8. As a leading-in conductor, a composite wire comprising an alloy having a layer thereon consisting entirely of chromium.

9. A leading-in conductor for a vitreous container, said conductor including a portion consisting of a metallic core having a coefficient of expansion substantially the same as the container and a layer of chromium on said core to provide a gas-tight seal between the leading-in conductor and the container.

10. A composite leading-in conductor for a glass container adapted to extend from within said container to the exterior thereof and comprising a metallic core having a layer of chromium thereon to provide a gas-tight seal with the wall of the container through which the conductor passes.

11. A leading-in conductor for a vitreous container including a section consisting of a metallic core having a coefficient of expansion substantially the same as the vitreous material of the container and a layer of chromium on said core to provide a gas-tight seal between the leading-in conductor and the container.

12. An article of manufacture consisting of a wall of glass having sealed therethrough a chromium coated wire.

13. The combination of a vitreous material and a body having a coating entirely of chromium united to said body and in gas-tight contact with said material.

14. The combination with an evacuated incandescent electric lamp bulb of vitreous material, of a composite leading-in wire passing through a wall of the bulb, said leading-in wire having an external layer entirely of chromium for contact with the material of the wall of the bulb to provide a gas-tight seal.

15. The combination of a gas-tight receptacle having a wall of vitreous material of a composite leading-in wire sealed therein, said wire comprising a metallic core and a coating thereon of chromium.

16. The combination of a vitreous material, a metallic core sealed in said material, and joined thereto by means of chromium, said core having a coefficient of expansion substantially equal to that of the vitreous material in which said core is sealed.

17. The combination of a portion of glass, a nickel-iron alloy to be sealed in said glass, said alloy having a coefficient of expansion substantially equal to that of the glass, and a coating of chromium placed on the portion of said alloy held in said glass.

In testimony whereof, I have hereunto subscribed my name this 28th day of March 1921.

DANIEL SNYDER GUSTIN.